United States Patent
Xu

(10) Patent No.: US 8,054,749 B2
(45) Date of Patent: Nov. 8, 2011

(54) METHOD AND APPARATUS FOR CHECKING MAINTENANCE ASSOCIATION INTEGRITY AND METHOD AND APPARATUS FOR ADDING MAINTENANCE END POINT

(75) Inventor: Ming Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 11/843,766

(22) Filed: Aug. 23, 2007

(65) Prior Publication Data

US 2008/0049607 A1 Feb. 28, 2008

(30) Foreign Application Priority Data

Aug. 28, 2006 (CN) .......................... 2006 1 0111970

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)

(52) U.S. Cl. .................. 370/236.2; 370/241.1; 370/242; 370/245

(58) Field of Classification Search .............. 370/236.2, 370/241.1, 242, 245
See application file for complete search history.

(56) References Cited

U.S. PATENT DOCUMENTS

| | | | |
|---|---|---|---|
| 6,331,983 B1 * | 12/2001 | Haggerty et al. | 370/400 |
| 6,687,225 B1 * | 2/2004 | Kawarai et al. | 370/230.1 |
| 6,865,602 B1 * | 3/2005 | Nijemcevic et al. | 709/223 |
| 6,965,928 B1 * | 11/2005 | Cox et al. | 709/220 |
| 7,193,996 B2 * | 3/2007 | Dobbins et al. | 370/392 |
| 7,512,141 B2 * | 3/2009 | Elie-Dit-Cosaque et al. | 370/408 |

(Continued)

FOREIGN PATENT DOCUMENTS

CN 1794662 A 6/2006

(Continued)

OTHER PUBLICATIONS

IEEE P802.1ag/D4.1 Draft Standard for Local and Metropolitan Area Networks; "Virtual Bridged Local area Networks—Amendment 5: Connectivity Fault Management"; Aug. 18, 2005.*

(Continued)

*Primary Examiner* — Aung S Moe
*Assistant Examiner* — Benjamin H Elliott, IV
(74) *Attorney, Agent, or Firm* — Conley Rose, P.C.; Grant Rodolph

(57) ABSTRACT

The present invention discloses a method for checking MA integrity, including: creating an MEP a; determining, by an MEP c in an MA, whether an MEP b with the same source port information as the MEP a exists in the MA; if there exists an MEP b with the same source port information as the MEP a in the MA, no isolated and unmated MEP exists in the MA; if an MEP b with the same source information as the MEP a does not exist in the MA, an isolated MEP exists in the MA. The present invention also discloses an apparatus for checking an MA integrity and a method and an apparatus for adding an MEP. The present invention enables a user to know whether an MA is integral and ensures MA integrity.

8 Claims, 3 Drawing Sheets

U.S. PATENT DOCUMENTS

| | | | |
|---|---|---|---|
| 7,515,542 B2* | 4/2009 | Hertoghs et al. | 370/236.2 |
| 7,688,742 B2* | 3/2010 | Sridhar et al. | 370/241.1 |
| 7,697,440 B2* | 4/2010 | Elie-Dit-Cosaque et al. | 370/241 |
| 7,756,956 B2* | 7/2010 | Jean | 709/222 |
| 7,768,928 B2* | 8/2010 | Harel et al. | 370/241.1 |
| 7,782,761 B2* | 8/2010 | Salam et al. | 370/216 |
| 2005/0099951 A1* | 5/2005 | Mohan et al. | 370/241 |
| 2005/0099954 A1* | 5/2005 | Mohan et al. | 370/241.1 |
| 2006/0007867 A1* | 1/2006 | Elie-Dit-Cosaque et al. | 370/241.1 |
| 2006/0056414 A1* | 3/2006 | Elie-Dit-Cosaque et al. | 370/392 |
| 2006/0133284 A1 | 6/2006 | Elie-Dit-Cosaque et al. | |
| 2006/0153220 A1* | 7/2006 | Elie-Dit-Cosaque et al. | 370/432 |
| 2006/0227807 A1* | 10/2006 | Jakubik et al. | 370/466 |
| 2007/0014290 A1* | 1/2007 | Dec et al. | 370/390 |
| 2007/0025256 A1* | 2/2007 | Hertoghs et al. | 370/236.2 |
| 2007/0140126 A1* | 6/2007 | Osswald et al. | 370/236.2 |
| 2007/0223493 A1* | 9/2007 | Sridhar et al. | 370/395.53 |
| 2008/0049607 A1* | 2/2008 | Xu | 370/216 |
| 2008/0056254 A1* | 3/2008 | Sridhar et al. | 370/390 |
| 2008/0279105 A1* | 11/2008 | Absillis et al. | 370/236.2 |
| 2008/0313347 A1* | 12/2008 | Kasturi et al. | 709/237 |

FOREIGN PATENT DOCUMENTS

| | | |
|---|---|---|
| CN | 1801742 A | 7/2006 |
| WO | 2006/069370 A2 | 6/2006 |

OTHER PUBLICATIONS

K. Sridhar, et al; "End-To-End Ethernet Connectivity Fault Management in Metro and Access Networks;" Internet Citation Jun. 30, 2005; Retrieved from the Internet: URL:http;//www.alcatel.com/com/en/appconte/nt/apl/T0605-CFM-EN_tcm172-2884.

ITU-T SG 13: "OAM Functions and Mechanisms for Ethernet based Networks;" Draft Recommendation Y.17ETHOAM, May 2006, pp. 1-79, Retrieved from the Internet: URL:https://datatracker.1etf.org/documents/LIAISON/file162.pdf.

Dinesh Mohan, et al; "L2VPN OAM Requirements and Framework draft-ietf-l2vpn-oam-req-frmk-06.t;" IEFT Standard-Working-Draft, Internet Engineering Task Force, IEFT,CH, vol. 12vpn, No. 6, Jul. 2006.

Liao Huimin, et al; "Theory and Realization of Connectivity Fault Management Technology" pp. 92-95 Telecommunication Technology/ Aug. 2006.

Lan Man Standards Committee of the IEEE Computer Society; "Virtual Bridged Local Area Networks—Amendment 5: Connectivity Fault Management", IEEE P802.1ag/D1.0 Dec. 3, 2004, Draft Standard for Local and Metropolitan Area Networks, 106 pages.

Editor, Y.17ethoam; "Draft Recommendation Y.17ethoam—OAM Functions and Mechanisms for Ethernet based Networks", Geneva Apr. 25-May 6, 2005, 96 pages.

International Telecommunication Union; "Series Y: Global Information Infrastructure, Internet Protocol Aspects and Next Generation Networks, Internet protocol aspects—Operation, administration and maintenance", ITU-T Telecommunication Standardization Sector of ITU Y.1730 (Jan. 2004) 26 pages.

The First Office Action regarding the European Counterpart Application 07 114 925.6-1525.

* cited by examiner

US 8,054,749 B2

METHOD AND APPARATUS FOR CHECKING MAINTENANCE ASSOCIATION INTEGRITY AND METHOD AND APPARATUS FOR ADDING MAINTENANCE END POINT

This application is claiming priority of Chinese Application Number 200610111970.4 filed on Aug. 28, 2006, entitled "METHOD AND APPARATUS FOR CHECKING MAINTENANCE ASSOCIATION INTEGRITY AND METHOD AND APPARATUS FOR ADDING MAINTENANCE END POINT" and incorporated herein by reference in its entirety.

FIELD OF THE INVENTION

The present invention relates to the field of network management technology, particularly to a method and an apparatus for checking integrity of a maintenance association (MA) and a method and an apparatus for adding a maintenance end point (MEP).

BACKGROUND OF THE INVENTION

In an IEEE (Institute of Electrical and Electronics Engineers) standard document for connection fault management (IEEE802.1ag), the maintenance domain (MD) and MA are described as follows: an MD is a network or a part of a network where failed connections can be managed, and all MEPs in an MD are on the same maintenance level; an MA is a subset of an MD and a set of MEPs that may communicate with each other in a certain service flow.

The existing IEEE802.1ag standard provides an explicit definition of an MA and specifies that all operation, administration and maintenance (OAM) tests must be carried out among MEPs in a certain MA. The MA integrity refers to: an MA must include necessary MEPs, and all MEPs in an MA are mated and may be OAM tested normally, i.e., no isolated and unmated MEP exists in an MA. If an isolated MEP exists in an MA, or an isolated MEP occurs because an MEP exits the MA which is integral, the OAM tests can not be performed for the isolated MEP, and the MA is not integral. Each MEP in an MA locally maintains an information table for all MEPs in the MA; the table is referred to as a local MEP table, which includes the following information: an MEP ID (identifier) and a corresponding source port of the MEP. However, the existing IEEE802.1ag standard does not provide the description or the solution on how to know whether an MA is integral and how to ensure MA integrity.

SUMMARY OF THE INVENTION

The present invention provides a method and an apparatus for checking an MA integrity and a method and an apparatus for adding an MEP, so as to check whether an MA is integral and ensure MA integrity.

The present invention provides the following technical solution to solve the above problems.

A method for checking MA integrity, including:
determining whether another MEP with same source port information as an MEP exists in an MA; if Yes, no isolated and unmated MEP exists in the MA; otherwise, an isolated MEP exists in the MA.

Before the determining whether another MEP with the same source port information as an MEP exists in the MA, the method further includes:
sending a request for joining the MA;
receiving the request for joining the MA; and
comparing the source port information carried in the request for joining the MA with the information in a local MEP table.

The sending the request for joining the MA includes:
sending the request for joining the MA periodically.

An apparatus for checking MA integrity, including: an MEP and an integrity checking MEP in an MA.

The MEP in the MA is adapted to determine whether another MEP with the same source port information as the integrity checking MEP exists in the MA; if Yes, no isolated and unmated MEP exists in the MA; otherwise, an isolated MEP exists in the MA.

The integrity checking MEP is adapted to send the request for joining the MA to the MEP in the MA periodically.

The MEP in the MA is also adapted to receive the request for joining the MA from the integrity checking MEP and compare the source port information carried in the request for joining the MA with information in a local MEP table.

A method for adding an MEP, including:
determining whether another MEP with the same source port information as an MEP exists in an MA; if Yes, no isolated and unmated MEP exists in the MA and no operation is performed; otherwise, an isolated MEP exists in the MA and a message for allowing the MEP to join the MA is sent to the MEP;
receiving, by the MEP, the message and joining the MA.

Before the determining whether another MEP with the same source port information as the MEP exists in the MA, the method further includes the following steps:
sending a request for joining the MA;
receiving the request for joining the MA; and
comparing the source port information carried in the request for joining the MA with the information in a local MEP table.

The sending the request for joining the MA includes:
sending the request for joining the MA periodically.

After the sending the message for allowing the MEP to join the MA to the MEP and before the MEP receiving the message and joining the MA, the method further includes:
adding the information of the MEP to the local MEP table.

An apparatus for adding an MEP, including: an MEP in an MA and an MEP requesting for joining an MA;
the MEP in an MA is adapted to determine whether another MEP with the same source port information as the MEP requesting for joining the MA exists in the MA; if Yes, no isolated and unmated MEP exists in the MA and no operation is preformed; otherwise, an isolated MEP exists in the MA and a message for allowing the MEP to join the MA is sent to the MEP; and
the MEP requesting for joining the MA is adapted to receive the message for allowing to join the MA sent from the MEP in the MA.

The MEP requesting for joining is also adapted to send the request for joining the MA to the MEP in the MA periodically.

The MEP in the MA is also adapted to receive the request for joining the MA from the MEP requesting for joining, compare the source port information carried in the request for joining the MA with the information in the local MEP table, and add the information of the MEP requesting for joining to a local MEP table.

According to the above description, the present invention has advantages as follows:

1. In the present invention, an MEP a is created and an MEP c in an MA determines whether another MEP b with the same source port information as the MEP a exists in the MA; if Yes, no isolated and unmated MEP exists in the MA and the MEPs in the MA may be OAM tested in pair, and therefore the MA is integral; otherwise, an isolated and unmated MEP exists in the MA, and therefore the MA is not integral. In that way, whether the MA is integral may be determined.

2. In the present invention, by determining whether the MEP a may join the MA or not, the user may know whether the MA is integral and ensure the MA integrity. If the MEP b with the same source port information as the MEP a exists in the MA, then no isolated and unmated MEP exists in the MA and the MEPs in the MA may be OAM tested in pair, and therefore the MA is integral, meanwhile, no operation will be performed by the MEP c in the MA; if the MEP b with the same source port information as the MEP a does not exist, then no isolated and unmated MEP exists in the MA and the MA is not integral, meanwhile the MEP a may be added into the MA and be mated to the isolated MEP in the MA; therefore, the MEPs may be OAM tested in pair and MA integrity is ensured.

DETAILED DESCRIPTION OF THE EMBODIMENTS

Figure 1:
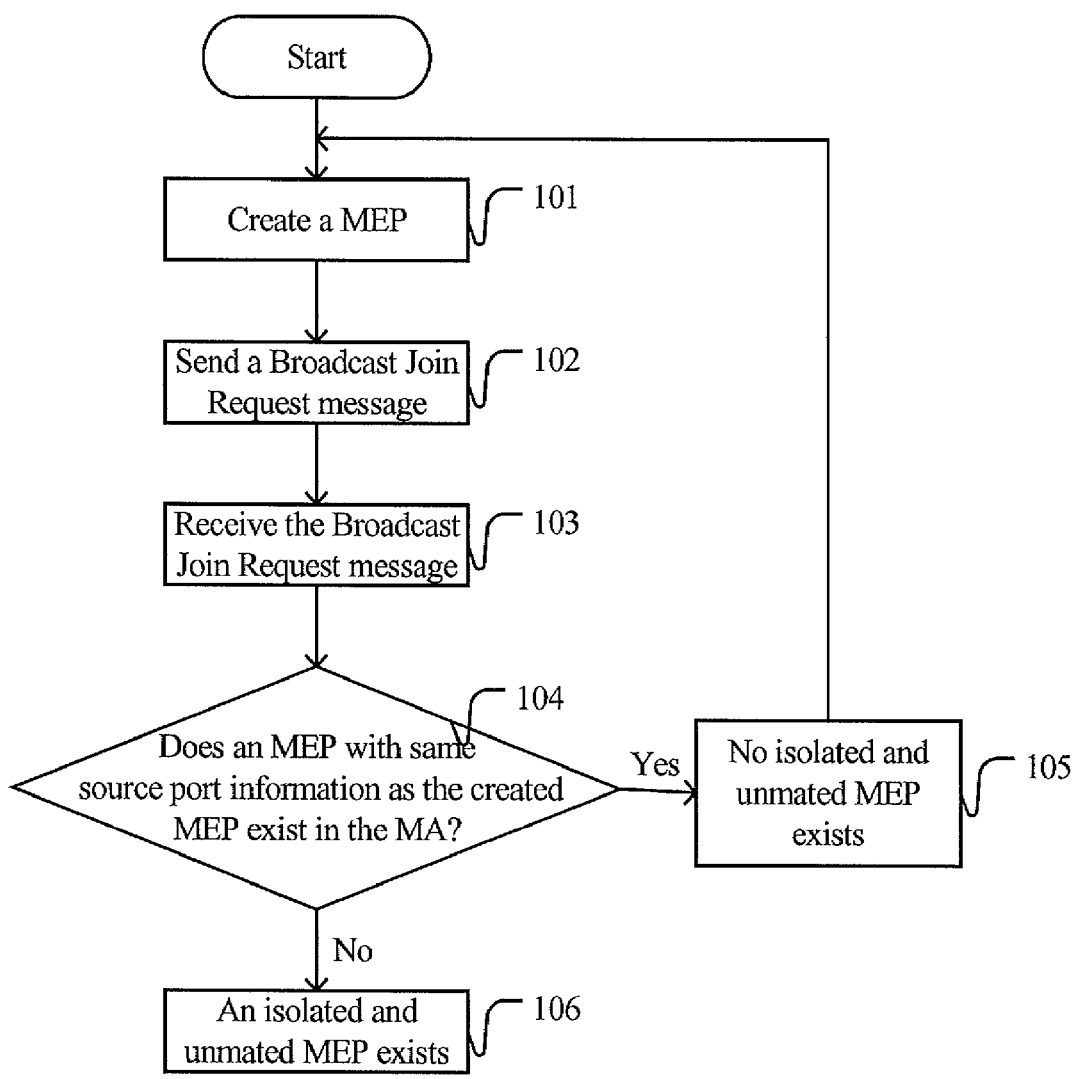
FIG. 1 is a flow diagram of the method for checking MA integrity provided in the present invention.

The MA integrity refers to: an MA should include necessary MEPs, all MEPs in the MA are mated and may be OAM tested normally, and no isolated and unmated MEP exists in the MA. If an isolated MEP exists in the MA, or an isolated MEP occurs because an MEP exits the MA that is originally integral, so that the isolated MEP may not be OAM tested and the MA is not integral.

Each MEP in an MA locally maintains a table of all MEPs existing in the MA; the table is referred as a local MEP table, which includes the following information: an MEP ID and a corresponding source port of MEP.

On the basis of the type of existing Ethernet Operation and Management (ETHOAM) message, three types of messages are added. They are Broadcast Join Request, Unitcast Join Response, and Broadcast Exit messages.

Broadcast Join Request message: once an MEP a is created, the MEP a broadcasts its ID to the MA with Broadcast Join Request message; the destination address of the Broadcast Join Request message is a broadcast address and the ID of the MEP a is carried in the Broadcast Join Request message;

Unicast Join Response message: after an MEP c in the MA receives the Broadcast Join Request message from an MEP a, the MEP c responds to the MEP a with a Unicast Join Response message and add the information of the MEP a into a local MEP table if the MEP a is legal; and the destination address of the Unicast Join Response message is the address of the MEP a and the ID of the MEP a is carried in the Unicast Join Response message;

Broadcast Exit message: when the MEP a request to exit the MA, the MEP a sends a Broadcast Exit message to the MA; after an MEP c in the MA receives the Broadcast Exit message, the MEP c deletes the information of the MEP a from the local MEP table, i.e., deletes the MEP a from the MA, meanwhile, the MEP a has exited the MA.

In the above description, an MEP a which sends the Broadcast Join Request message to the MA is legal and it refers that: an MEP b with the same source port information as the MEP a does not exist in the local MEP table, i.e., the MEP a is a new MEP that requests to join the MA; in contrast, an MEP a that sends the Broadcast Join Request message to the MA is illegal refers that: an MEP b with the same source port information as the MEP a exists in the local MEP table.

The source port mentioned in the above source port information is the port which receives the Broadcast Join Request message.

If the MEP a which sends the Broadcast Join Request message is legal, the MEP c in the MA will respond to the MEP a with a Unicast Join Response message and adds the information of the MEP a to the local MEP table. If the MEP a which sends the Broadcast Join Request message is illegal, no operation will be performed by the MEP c in the MA.

Before the MEP joins the MA, the MEP may negotiate and exchange the attribute information of the MEP and the MA with the MEP in the MA by sending the Broadcast Join Request message.

The MEP c in the MA traverses the local MEP table according to the source port in the received Broadcast Join Request message and determines whether an MEP a is legal; if the MEP a is legal, the MEP c in MA will respond to the MEP a a Unicast Join Response message to allow the MEP a to join the MA; otherwise, no operation will be performed by the MEP c in the MA.

After the MEP a joins the MA, the MEP a may send a Broadcast Exit message to the MA if it decides to exit the MA. After the MEP c in the MA receives the Broadcast Exit message from the MEP a, it will delete the information of the MEP a from the local MEP table, i.e., the MEP a is deleted from the MA; meanwhile, the MEP a has exited the MA.

The main idea of the method for checking an MA integrity according to the present invention is as follows.

Once an MEP a is created, an MEP c in the MA determines whether an MEP b with the same source port information as the MEP a exists in the MA; if Yes, no isolated and unmated MEP exists in the MA and the MEPs in the MA may be OAM tested in pair, and therefore the MA is integral; otherwise, an isolated and unmated MEP exists in the MA, and therefore the MA is not integral.

A method for checking an MA integrity as shown in FIG. 1, including the following blocks.

Block 101: An MEP a is created.

Block 102: The MEP a sends a Broadcast Join Request message to the MA, so as to request to join the MA.

Wherein, The MEP a sends the Broadcast Join Request message to the MA periodically.

Block 103: The MEP c in the MA receives the Broadcast Join Request message from the MEP a.

Block 104: according to the Broadcast Join Request message from the MEP a, the MEP c compares the source port information carried in the Broadcast Join Request message with the local MEP table, to determine whether an MEP b with the same source port information as the MEP a exists in the MA; if Yes, block 105 is performed; otherwise block 106 is performed.

Block 105: if an MEP b with the same source port information as the MEP a exists in the MA, then no isolated and unmated MEP exists in the MA and the MEPs in the MA may be OAM tested in pair, and therefore the MA is integral; and the process will return to block 101.

Block 106: if the MEP b with the same source port information as the MEP a does not exist, then an isolated and unmated MEP exists in the MA, and therefore the MA is not integral.

As described above, whether the MA is integral may be obtained by determining whether an MEP h with the same source port information as the MEP a exists in the MA. If an MEP b with the same source port information as the MEP a exists, then no isolated and unmated MEP exists in the MA and the MEPs in the MA may be OAM tested in pair, and therefore the MA is integral. If the MEP b with the same source port information as the MEP a does not exist in the MA, then an isolated and unmated MEP exists in the MA, and therefore the MA is not integral.

The main idea of the method for adding an MEP according to the present invention is as follows.

Once an MEP a is created, an MEP c in the MA determines whether an MEP b with the same source port information as the MEP a exists in the MA; if Yes, no operation will be performed; otherwise the MEP c in the MA will send a Join Response message to the MEP a.

The MEP a receives the Join Response message from MEP c and joins the MA.

Figure 2:
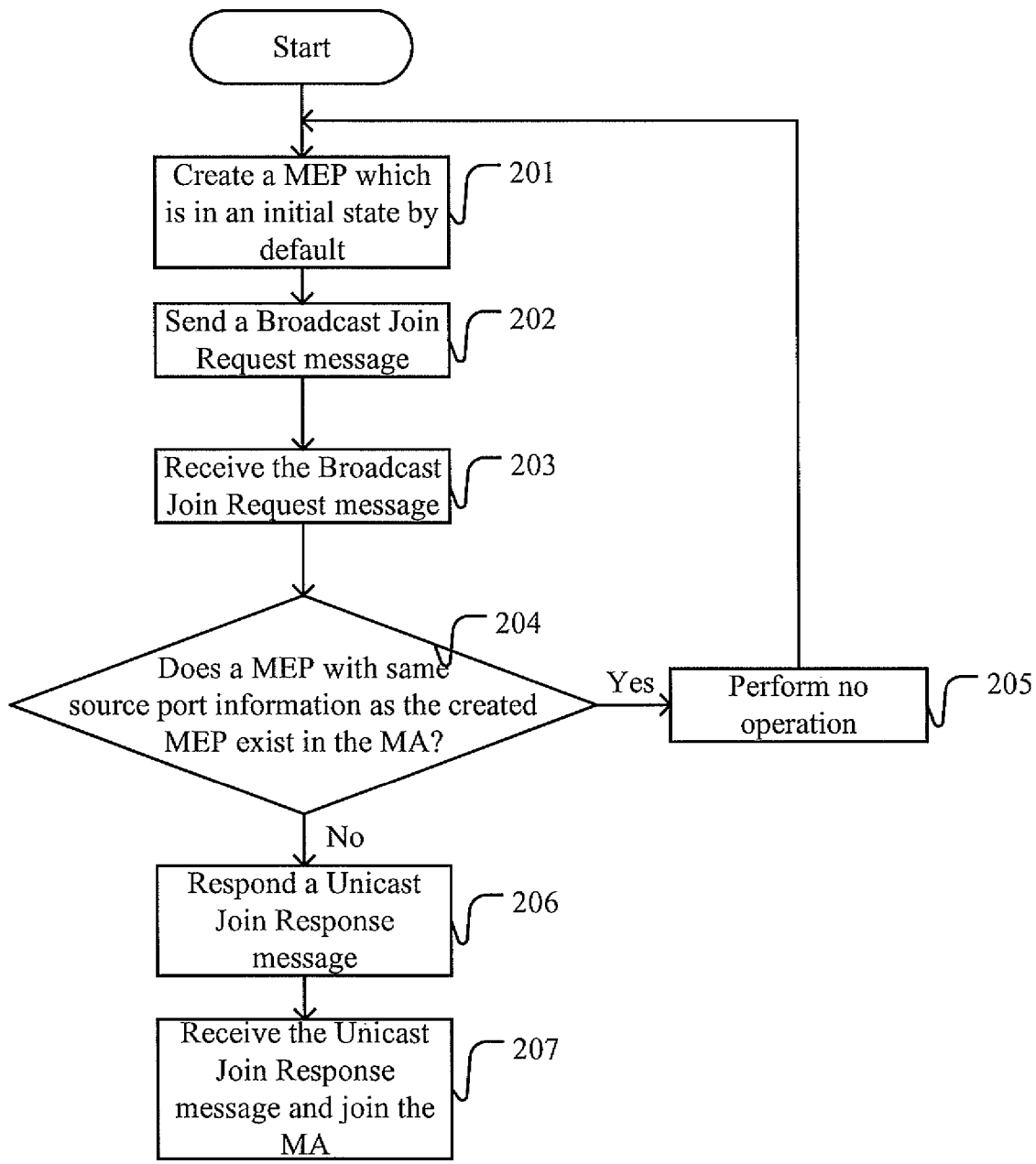
FIG. 2 is a flow diagram of the method for adding an MEP provided in the present invention.

A method for adding an MEP as shown in FIG. 2, including the following blocks.

Block 201: An MEP a is created.

Block 202: The MEP a sends a Broadcast Join Request message to the MA, to request to join the MA.

Wherein, the MEP a sends the Broadcast Join Request message to the MA periodically.

Block 203: The MEP c in the MA receives the Broadcast Join Request message from the MEP a in the MA.

Block 204: According to the Broadcast Join Request message from the MEP a, the MEP c compares the source port information carried in the Broadcast Join Request message with the local MEP table, to determine whether an MEP b with the same source port information as the MEP a exists; if Yes, block 205 is performed; otherwise block 206 is performed.

Wherein, if the MEP b with the same source port information as the MEP a exists in the MA, no isolated and unmated MEP exists in the MA and the MEPs in the MA may be OAM tested in pair, and therefore the MA is integral.

If the MEP b with the same source port information as the MEP a does not exist, an isolated and unmated MEP exists in the MA, and therefore the MA is not integral.

Block 205: No operation will be preformed by the MEP c in the MA and the processing returns to block 201.

Block 206: The MEP c in the MA responds to the MEP a with a Unicast Join Response message to allow the MEP a to join the MA; in addition, the MEP c also adds the information of the MEP a to the local MEP table.

Block 207: The MEP a receives the Unicast Join Response message from the MEP c in the MA, and joins the MA. Meanwhile, the MEP a is mated to the isolated MEP in the MA and may be OAM tested. Thus, the MA integrity is ensured.

As described above, by determining whether to allow the MEP a to join the MA or not, the user may know whether the MA is integral and ensure MA integrity. If an MEP b with the same source port information as the MEP a exists in the MA, no isolated and unmated MEP exists in the MA and the MEPs in the MA may be OAM tested in pair; therefore, the MA is integral and the MEP c in the MA will perform no operation. If the MEP b with the same source port information as the MEP a does not exist in the MA, the MA is not integral; in that case, the MEP a is added into the MA and is mated to the isolated MEP in the MA; thus, the MEPs may be OAM tested in pair and the MA integrity is ensured.

Figure 3:
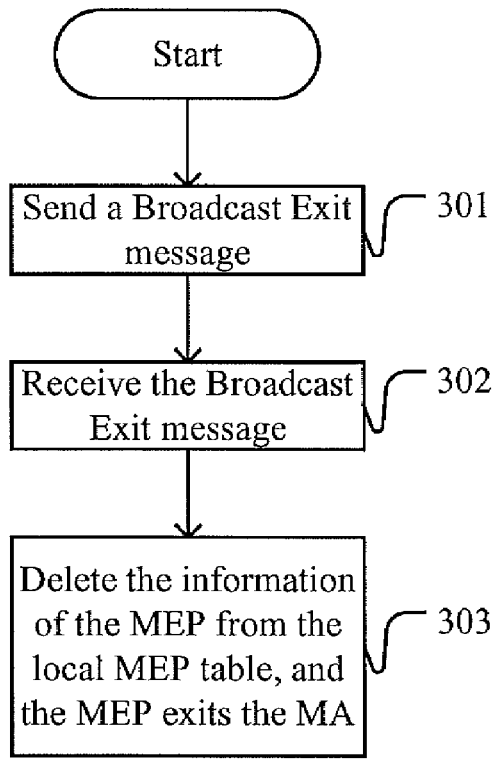
FIG. 3 is a flow diagram of an MEP exiting from an MA according to the present invention.

FIG. 3 is a flow diagram of an MEP a exiting from an MA in the case that MEP a requests to exit.

Block 301: When the MEP a requests to exit the MA, it sends a Broadcast Exit message to the MA.

Block 302: The MEP c in the MA receives the Broadcast Exit message from the MEP a.

Block 303: The MEP c in the MA deletes the information of the MEP a from the local MEP table, i.e., delete the MEP a from the MA, meanwhile the MEP a has exited the MA.

Figure 4:
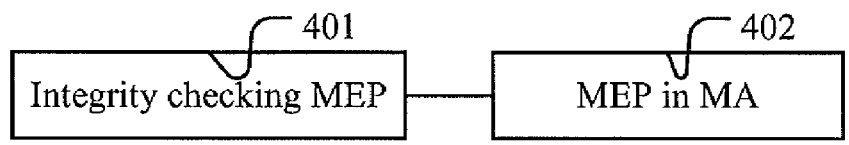
FIG. 4 is a schematic diagram of the apparatus for checking MA integrity provided in the present invention.

As shown in FIG. 4, an apparatus for checking an MA integrity, including: an integrity checking MEP 401 and an MEP 402 in the MA.

The integrity checking MEP 401 is adapted to send a Broadcast Join Request message to the MA periodically, to request to join the MA;

The MEP 402 in the MA is adapted to receive the Broadcast Join Request message from the integrity checking MEP 401 and compare the source port information carried in the Broadcast Join Request message with the information in the local MEP table, thus determines whether an MEP with the same source port information as the integrity checking MEP 401 exists in the MA; if Yes, no isolated and unmated MEP exists in the MA and the MEPs in the MA may be OAM tested in pair, and therefore the MA is integral; otherwise, an isolated and unmated MEP exists in the MA, and therefore the MA is not integral.

Figure 5:
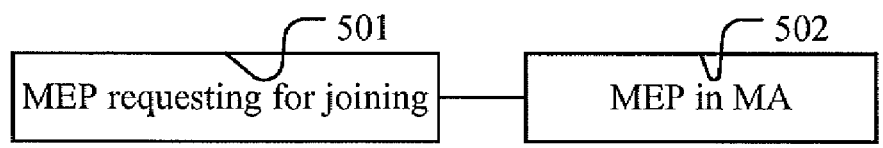
FIG. 5 is a schematic diagram of the apparatus for adding an MEP provided in the present invention.

As shown in FIG. 5, an apparatus for adding an MEP, including an MEP requesting for joining 501 and an MEP 502 in the MA.

The MEP requesting for joining 501 is adapted to send a Broadcast Join Request message to the MA periodically to request to join the MA and receive the Unicast Join Response message from the MEP 502 in the MA and then join the MA.

The MEP 502 in the MA is adapted to receive the Broadcast Join Request message from the MEP requesting for joining 501 and compare the source port information carried in the Broadcast Join Request message with the information in the local MEP table, to determine whether an MEP with the same source port information as the MEP requesting for joining 501 exists; if Yes, the MEP 502 performs no operation and determines that no isolated and unmated MEP exists in the MA, and the MEPs in the MA may be OAM tested in pair; therefore, the MA is integral; otherwise, the MEP 502 may determine that an isolated and unmated MEP exists in the MA; therefore, the MA is not integral, and it will send a Unicast Join Response message to the MEP requesting for joining 501 to allow the MEP requesting for joining 501 to join the MA, and add the information of the MEP requesting for joining 501 to the local MEP table.

The method and apparatus for checking an MA integrity as well as the method and apparatus for adding an MEP are described above. While the present invention has been illustrated with reference to certain preferred embodiments, the present invention is not limited to these. Those skilled in the art should recognize that various variations and modifications can be made without departing from the spirit and scope of the present invention as defined by the accompanying claims.

What is claimed is:

1. A method for checking a Maintenance Association (MA) integrity, comprising:
  receiving by an existing Maintenance End Point (MEP) C in an MA a request from a MEP A for joining the MA, wherein the request is a message according to Ethernet Operation, Administration and Management (ETHOAM) Protocol; and comparing source port information carried in the request with information in a local MEP table; and if the source port information carried in the request is the same as the information in the local MEP table, determining that a MEP B with the same source port information as the MEP A exists in the MA and confirming that the MA is integral;

otherwise, determining that no MEP with the same source port information as the MEP A exists in the MA and confirming that the MA is not integral.

2. The method according to claim 1, wherein the request for joining the MA is sent periodically.

3. An apparatus for checking a Maintenance Association (MA) integrity, comprising: an integrity checking Maintenance End Point (MEP) and a MEP in an MA; wherein, the MEP in the MA is adapted to receive a request for joining the MA from the integrity checking MEP, wherein the request is a message according to Ethernet Operation, Administration and Management (ETHOAM) Protocol, and compare source port information carried in the request with information in a local MEP table, and if the source port information carried in the request is the same as the information in the local MEP table, determine another MEP with the same source port information as the integrity checking MEP exists in the Maintenance Association and confirm that the MA is integral;

otherwise, determine that no MEP with the same source port information as the integrity checking MEP exists in the MA and confirm that the MA is not integral.

4. A method for adding a Maintenance End Point (MEP), comprising:

receiving by an existing MEP C in a Maintenance Association (MA) a request from a MEP A to join the MA, wherein the request is a message according to Ethernet Operation, Administration and Management (ETHOAM) Protocol; and comparing source port information carried in the request with information in a local MEP table; and if the source port information carried in the request is the same as the information in the local MEP table, determining that a MEP B with the same source port information as the MEP A exists in the MA and confirming that the MA is integral, and no operation is performed;

otherwise, determining that no MEP with the same source port information as the MEP A exists in the MA and confirming that the MA is not integral, and sending a message for allowing the MEP A to join the MA;

receiving the message and joining the MA by the MEP A.

5. The method according to claim 4, wherein the request for joining the MA is sent periodically.

6. The method according to claim 4, wherein, after sending the message for allowing the MEP A to join the MA and before the MEP A receiving the message and joining the MA, the method further comprises:

adding the information of the MEP A to the local MEP table by an MEP C.

7. An apparatus for adding a Maintenance End Point (MEP), comprising:

a MEP in a Maintenance Association (MA) and a MEP requesting for joining the MA; wherein, the MEP in the MA is adapted to receive a request for joining the MA from the MEP requesting for joining the MA, wherein the request is a message according to Ethernet Operation, Administration and Management (ETHOAM) Protocol, and compare source port information carried in the request with information in a local MEP table, and if the source port information carried in the request is the same as the information in the local MEP table, determine another MEP with the same source port information as the MEP requesting for joining the MA exists in the MA and confirm that the MA is integral, and no operation is preformed; otherwise, determine that no MEP with the same source port information as the MEP requesting for joining the MA exists in the MA and confirm that the MA is not integral, and send a message for allowing the MEP requesting for joining the MA;

the MEP requesting for joining the MA is adapted to receive the message and join the MA.

8. The apparatus according to claim 7, wherein, the MEP requesting for joining the MA is also adapted to send the request for joining the MA to the MEP in the MA periodically.

* * * * *